C. A. SIMMONS.
HOSE CLAMP.
APPLICATION FILED JULY 26, 1909.
1,166,158.
Patented Dec. 28, 1915.
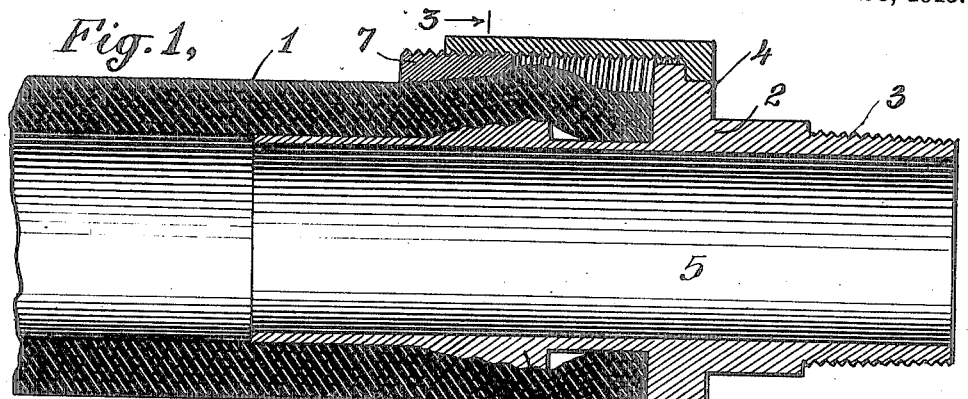
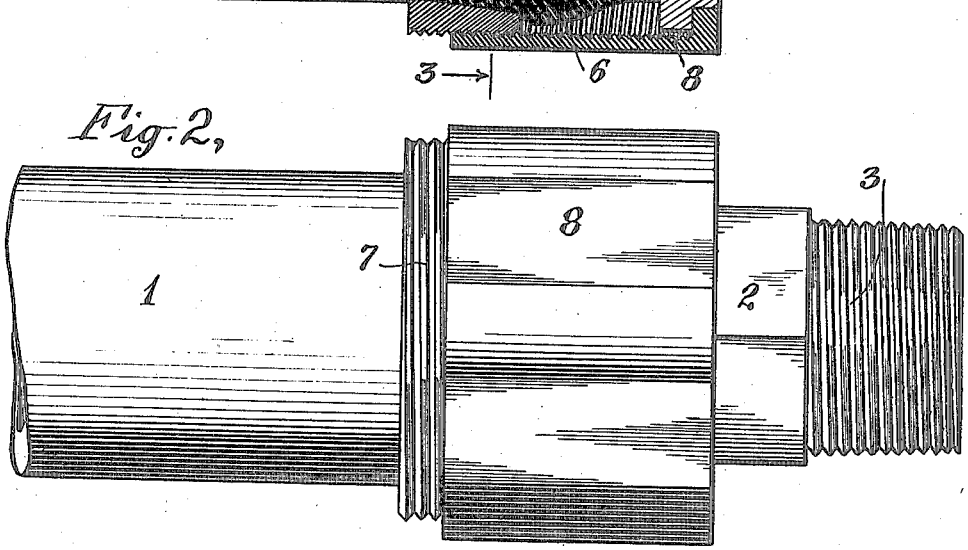
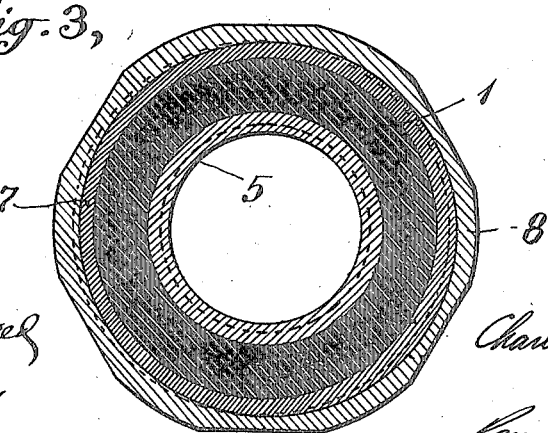
WITNESSES:
INVENTOR
Charles A. Simmons
BY
ATTORNEYS

UNITED STATES PATENT OFFICE.

CHARLES A. SIMMONS, OF ALBANY, NEW YORK.

HOSE-CLAMP.

1,166,158.  Specification of Letters Patent.  Patented Dec. 28, 1915.

Application filed July 26, 1909. Serial No. 509,653.

*To all whom it may concern:*

Be it known that I, CHARLES A. SIMMONS, a citizen of the United States, residing at Albany, county of Albany, and State of New York, have invented certain new and useful Improvements in Hose-Clamps; and I do hereby declare the following to be a full, clear, and exact description of the invention, such as will enable others skilled in the art to which it appertains to make and use the same.

The object of the invention is to provide an improved clamp for securely holding the end of a flexible hose to the stem of its nipple, and to this end I take advantage of the common characteristic of such hose which permits it to be compressed and expanded by appropriately directed pressure.

The particular nature of the improved clamp and the manner in which this characteristic is taken advantage of, will be understood from a consideration of the following description and the accompanying drawings, in which—

Figure 1 is a central section of the end of a flexible hose with the nipple and the attaching clamp; Fig. 2 is an elevation of the same parts, and Fig. 3 is a transverse section on the line 3—3 of Fig. 1.

In the drawings I have illustrated the end of the flexible hose 1 connected to a nipple 2 which nipple is of the type commonly employed in connection with air brake or steam pipe couplings for railway cars, and it has the usual threaded end 3, shoulder 4, and stem 5 adapted to project within the end of the hose. In accordance with my invention the stem 5 of the nipple has substantially the same diameter immediately adjacent the shoulder that it has at the extremity which is intended to be inserted within the end of the hose, and this diameter does not in either place substantially exceed the internal diameter of the hose; but between these regions, the stem 5 is provided with an annular or circumferential enlargement or boss 6 which is spaced apart from the shoulder 4 by the stem portion of small diameter, so as to leave a recess between the boss and shoulder, within which recess the end of the hose lies substantially free from radial stretch as illustrated in Fig. 1. For the purpose of drawing the body of the hose toward and compressing it against the enlargement 6, there is provided a clamping ring 7, of an internal diameter substantially the same as the external diameter of the hose, so that it may be slipped over the end of the hose before the nipple stem is inserted, and having an extended bearing surface in contact with the hose; and this clamping ring has means for drawing it toward the enlargement or boss 6 comprising a flanged sleeve 8, the flange of which takes over the shoulder 4 on the nipple, and rests upon a reduced portion of that shoulder as illustrated in Fig. 1. This sleeve has flattened portions on its exterior to adapt it to a wrench, and is screw-threaded on its interior to engage the screw-threaded exterior of the clamping ring 7 and draw the clamping ring toward the shoulder 4 and thereby draw the hose toward the boss or enlargement 6, until its end abuts the shoulder 4. Thereafter, further drawing-up of the clamping ring 7 compresses the hose between the ring and the boss and causes it to expand in the chamber formed by the space between the boss 6 and the shoulder 4 and the interior of sleeve 8. This compression and enlargement of the hose is permitted by the rubber or other elastic or yielding material commonly found in flexible hose, and it results in forming the end of the hose with a portion of reduced thickness, between the inner face of clamping ring 7 and the outer face of boss or enlargement 6, and with a bulged portion of greater thickness within the chamber above mentioned.

In order that the stem of the nipple with its enlargement or boss may pass easily into the end of the hose the boss or enlargement is preferably given a bevel or taper as shown, and the inner face of clamping ring 7 may also have a slight bevel, though it should not be as pronounced as the bevel on boss 6. The boss 6 may also be given an irregular or wave-like surface as indicated in the drawings to more tightly hold the hose, and in any event it will best perform its function if it terminates on the side toward shoulder 4 in a sharp shoulder as shown.

It will be observed that the function of the ring 7 is not alone to compress the body of the hose against the boss or enlargement 6 and thereby form the portion of reduced diameter, but it is also to force the elastic or yielding material of the hose longitudinally past the boss or enlargement into the recess between said boss and the shoulder 4 and against said shoulder, as shown in Fig. 1 of the drawings, to thereby form an expanded enlargement at the end of the hose, It is necessary, if this second function is to be attained, that the surface of engagement between the hose and the ring 7 should be of considerable extent, and it is preferable, as suggested, that the inner face of the ring should have a bevel slightly less sharp than the bevel of the boss or enlargement 6, so that the hose will not be sharply indented or pinched at any point of the clamping area, but will nevertheless have the point of greatest compression at the front end of the clamping ring so that the yielding material of the hose will be forced longitudinally over the boss or enlargement. It is also necessary to this effect that the boss or enlargement 6 shall not be sufficiently great to unduly stretch the hose. Hose employed for this purpose has a well defined limit of stretch, and if this limit is too nearly approached by the stretching due to the boss or enlargement 6 there is developed a reaction which, acting upon the incline of the boss or enlargement, has a powerful component tending to draw the hose off the enlargement and to prevent the free return of the hose to its normal diameter in the space between the boss and the shoulder 4. The drawings herein are made to scale from a practical embodiment of the invention which I have found entirely satisfactory for the intended purpose, and represent desirable dimensions.

What I claim is:

1. In a hose-clamping device, a shouldered nipple having an inclined circumferential boss on its stem of sufficient size to spread without unduly stretching the hose, said boss being spaced apart from the shoulder by a stem portion of a reduced diameter which does not substantially exceed the internal diameter of the hose, whereby the extremity of the hose, after it is placed over the boss, may return substantially to its original diameter thereby avoiding contractile forces tending to pull the hose off the nipple, an interiorly screw-threaded sleeve extending from the shoulder of the nipple and overhanging the hose-receiving portion thereof, and an exteriorly screw-threaded interiorly beveled clamping ring engaging the screw-threads on the interior of said sleeve, the inclination of the circumferential boss and of the interior bevel of the clamping ring being such that the material of the hose is forced by the drawing up of the clamping ring over the boss into the annular space between it and the shoulder and against said shoulder to produce within the said annular space a substantial increase of the normal thickness of the hose, forming an annular bead on the end of the hose adapted to resist the withdrawal of the hose from the nipple.

2. In a hose-clamping device, a shouldered nipple having an inclined circumferential boss on its stem of sufficient size to spread without unduly stretching the hose, said boss being spaced apart from the shoulder by a stem portion of a reduced diameter which does not substantially exceed the internal diameter of the hose, whereby the extremity of the hose, after it is placed over the boss, may return substantially to its original diameter thereby avoiding contractile forces tending to pull the hose off the nipple, an interiorly screw-threaded sleeve freely rotatable on said shoulder and extending therefrom over the hose-receiving portion of the nipple, and an exteriorly screw-threaded interiorly beveled clamping ring engaging the screw-threads on the interior of said sleeve, the inclination of the circumferential boss and of the interior bevel of the clamping ring being such that the material of the hose is forced by the drawing up of the clamping ring over the boss into the space between it and the said shoulder and against said shoulder, to produce within the said annular space a substantial increase of the normal thickness of the hose, forming an annular bead on the end of the hose adapted to resist the withdrawal of the hose from the nipple.

3. In a hose-clamping device, a shouldered nipple having an inclined circumferential boss on its stem of sufficient size to spread without unduly stretching the hose, said boss being spaced apart from the shoulder by a stem portion of a reduced diameter which does not substantially exceed the internal diameter of the hose, whereby the extremity of the hose, after it is placed over the boss, may return substantially to its original diameter, thereby avoiding contractile forces tending to pull the hose off the nipple, an interiorly beveled clamping ring surrounding the hose, and means for drawing the clamping ring toward the shoulder, the inclination of the circumferential boss and of the interior bevel of the clamping ring being such that the material of the hose is forced by the drawing up of the clamping ring over the boss into the space between it and the said shoulder and against said shoulder, to produce within the said annular space a substantial increase of the normal thickness of the hose, forming an annular bead on the end of the hose adapted to resist the withdrawal of the hose from the nipple.

In testimony whereof I affix my signature, in presence of two witnesses.

CHARLES A. SIMMONS.

Witnesses:
LAURA B. PENFIELD,
WILLIAM D. BREYER.